(12) United States Patent
Lee

(10) Patent No.: US 7,065,196 B2
(45) Date of Patent: Jun. 20, 2006

(54) ENTRANCE INTERCOM SYSTEM

(76) Inventor: Tsung-Chiang Lee, 3F., No. 13, Lane 38, Pu Tang Street, Chung Li City, Toayuan Hsien (TW)

( * ) Notice: Subject to any disclaimer, the term of this patent is extended or adjusted under 35 U.S.C. 154(b) by 89 days.

(21) Appl. No.: 10/607,112

(22) Filed: Jun. 27, 2003

(65) Prior Publication Data

US 2004/0057567 A1    Mar. 25, 2004

(30) Foreign Application Priority Data

Jun. 28, 2002    (TW) ................ 91114418 A

(51) Int. Cl.
- H04M 11/00    (2006.01)
- H04M 1/60    (2006.01)
- H04M 9/00    (2006.01)
- H04M 3/00    (2006.01)
- G05B 19/00    (2006.01)

(52) U.S. Cl. .................... 379/167.07; 379/167.01; 379/102.06; 455/420; 340/5.2; 340/5.61; 340/5.7

(58) Field of Classification Search ......... 379/102.01, 379/102.02, 102.06, 167.01, 167.06, 167.07, 379/167.11; 455/418, 419, 420; 340/5.2, 340/5.22, 5.6, 5.61, 5.63, 5.64, 5.7, 5.71, 340/5.8, 825.37

See application file for complete search history.

(56) References Cited

U.S. PATENT DOCUMENTS

| | | | | |
|---|---|---|---|---|
| 5,517,185 A | * | 5/1996 | Acimovic et al. | 340/5.33 |
| 5,646,605 A | * | 7/1997 | Leonaggeo et al. | 340/5.64 |
| 5,979,754 A | * | 11/1999 | Martin et al. | 235/382 |
| 5,982,861 A | * | 11/1999 | Holloway et al. | 379/102.06 |
| 6,078,653 A | * | 6/2000 | Jean-Claude et al. | 379/167.01 |
| 6,671,360 B1 | * | 12/2003 | Sumiya et al. | 379/167.15 |
| 6,720,861 B1 | * | 4/2004 | Rodenbeck et al. | 340/5.64 |

* cited by examiner

*Primary Examiner*—Quoc Tran
(74) *Attorney, Agent, or Firm*—Troxell Law Office, PLLC

(57) ABSTRACT

An entrance intercom system comprises the following elements. A data base is applied to store the resident codes, the phone numbers and the identity recognizing codes of the residents. A communication module is coupled with public switch telephone networks to provide the communicating function between the visitors and the residents, and to receive the incoming phone calls. A CPU responsive to the resident codes input by the visitors can select the phone numbers of the resident stored in the database, and drive the communication module automatically to phone the resident. An incoming phone numbers collecting module is applied to collect the incoming phone numbers. The CPU can compare the incoming phone numbers and the numbers stored in the database. When the incoming phone number is identical to one stored in the data base, the CPU can unlock the gate.

2 Claims, 3 Drawing Sheets

ENTRANCE INTERCOM SYSTEM

FIELD OF THE INVENTION

The present invention relates to an entrance intercom system, and more particularly, to an entrance security intercom system utilized to provide communication between visitors and residents via public switch telephone networks and the operating method thereof.

BACKGROUND OF THE INVENTION

With the developments of industry and commerce, a large number of people migrate into the cities thereby increasing the population density of the metropolis. For solving the problem of crowded living space, tall buildings and great mansions are built to take the place of traditional solitude house to provide people adequate living space. Under this condition, various apartments, dwelling, and multi-storey buildings are built and become the first choice when the common people want to buy a house.

However, for the great part of community dwellings, the traffic thoroughfares in the peripheral circumstances extend to all directions, thereby making the community open to public access. Under the condition of less private matters, it is easy for thieves and bandits to make an incursion that causes the security safeguard more difficult. Especially, when the political and economical affairs fluctuate considerably, the legal cases, such as steal, robbery and even arson, are continuously rising and render the public security corrupting. Further, because the resident families usually do not know each other in the multi-storey buildings, the identities of persons entering the building can not be recognized and controlled effectively, thereby lowering the security.

Besides, for current multi-storey buildings, they have a great deal of resident families, so it is difficult to fabricate an intercom on the front gate of the community, comprising the large number of buttons responsive to the doorbell of each resident family, to allow the visitors can contact with some residents directly. For solving this issue, in the large community or building, they usually establish a community managing commission for monitoring the entrance of the building to reduce the hazards of lawless invasions. The typical manner is to set up a guardroom adjacent to the front gate of the community or building, to examine and recognize all the persons want to enter. And for further prohibiting from the disturbing by non-residents, some ID recognizing means or entrance guard means can be fabricated on the gate to recognize the identities of people entering the building.

It is noted that the above manner still encounters some problems. First, the security guards usually spend lot of labor effort on some sundry duties and thereby unable to pay attention to the security protection of the community. For example, to lock/unlock the gate is controlled by the security guards, that means when visitors want to visit some one resident, the security guard have to contact with the resident via the intercom and ascertain the identity of the visitor, and then to open the gate for entry. Once a lot of persons want to enter in or go out, the security guards have to face lot of asking and will be too busy to make proper entrance management.

Further, when the resident is not at home or is not available to answer the intercom, the security guard should be incapable of ascertaining the visitor's identity. Though in some community or building, the residents will be requested to provide the urgent phone numbers for emergent contact. However, this manner will increase the hazards of revealing private matters of the residents, especially when the members of the community managing commission leave their jobs. So how to keep the private matters of the residents and how to provide more effective entrance guarding have become the important issues nowadays.

SUMMARY OF THE INVENTION

It is therefore an objective of the present invention to provide an entrance intercom system, having a database for storing the wired phone numbers and the cellular phone numbers of the residents. When visitors want to visit some residents, they can contact with the residents using the entrance intercom system via the public switch telephone network.

Another purpose of the present invention is to provide an entrance intercom system having the phone numbers of the residents therein, so as to allow the residents use their phone to dial the entrance intercom system for opening the gate of the community.

An entrance intercom system is fabricated on the gate of a community, providing the functions of communicating between visitors and residents, identity recognizing, locking/unlocking the gate. The entrance intercom system comprises the following elements. A data base is applied to store the resident codes, the phone numbers and the identity recognizing codes of the residents of the community. A communication module is coupled with public switch telephone networks, providing the communicating function between the visitors and the residents, and receiving the incoming phone calls. A CPU is connected with the data base and the communication module respectively, responsive to the resident codes input by the visitors via a dialing keyboard, to select the phone numbers of the resident stored in the data base, and to drive the communication module automatically to dial the resident for providing the communicating function between the visitors and the resident. An incoming phone numbers collecting module is connected with the communication module and the CPU respectively, collecting the incoming phone numbers, the CPU can compare the incoming phone numbers and the phone numbers of the residents stored in the data base, when the incoming phone number is identical to one of the phone numbers of the residents in the data base, the CPU will send a signal to unlock the gate. A RF identification device is applied for detecting the RF messages of identity recognizing and sending to the CPU, the CPU can compare the RF messages with the identity recognizing codes stored in the data base, when the RF message is identical to that of the resident in the data base, the CPU will send a signal to unlock the gate. A remote control receiving means is used for receiving remote control messages of identity recognizing and sending to the CPU, the CPU can compare the remote control messages with the identity recognizing codes stored in the data base, when the remote control message is identical to one of the identity recognizing codes of the residents, the CPU will send a signal to unlock said gate.

BRIEF DESCRIPTION OF THE DRAWINGS

The invention can be more fully understood by reading the following detailed description of the preferred embodiments, with reference made to the accompanying drawings, wherein.

DETAILED DESCRIPTION OF THE PREFERRED EMBODIMENT

The present invention provides a entrance intercom system, storing the wired phone numbers and the cellular phone numbers of the residents, so as to provide the visitors the ability to contact with the residents via public switch telephone networks and provide the residents the ability to lock/unlock the gate by using their telephone to dial the entrance intercom system. The detailed description of the present invention is as follows.

Figure 1:
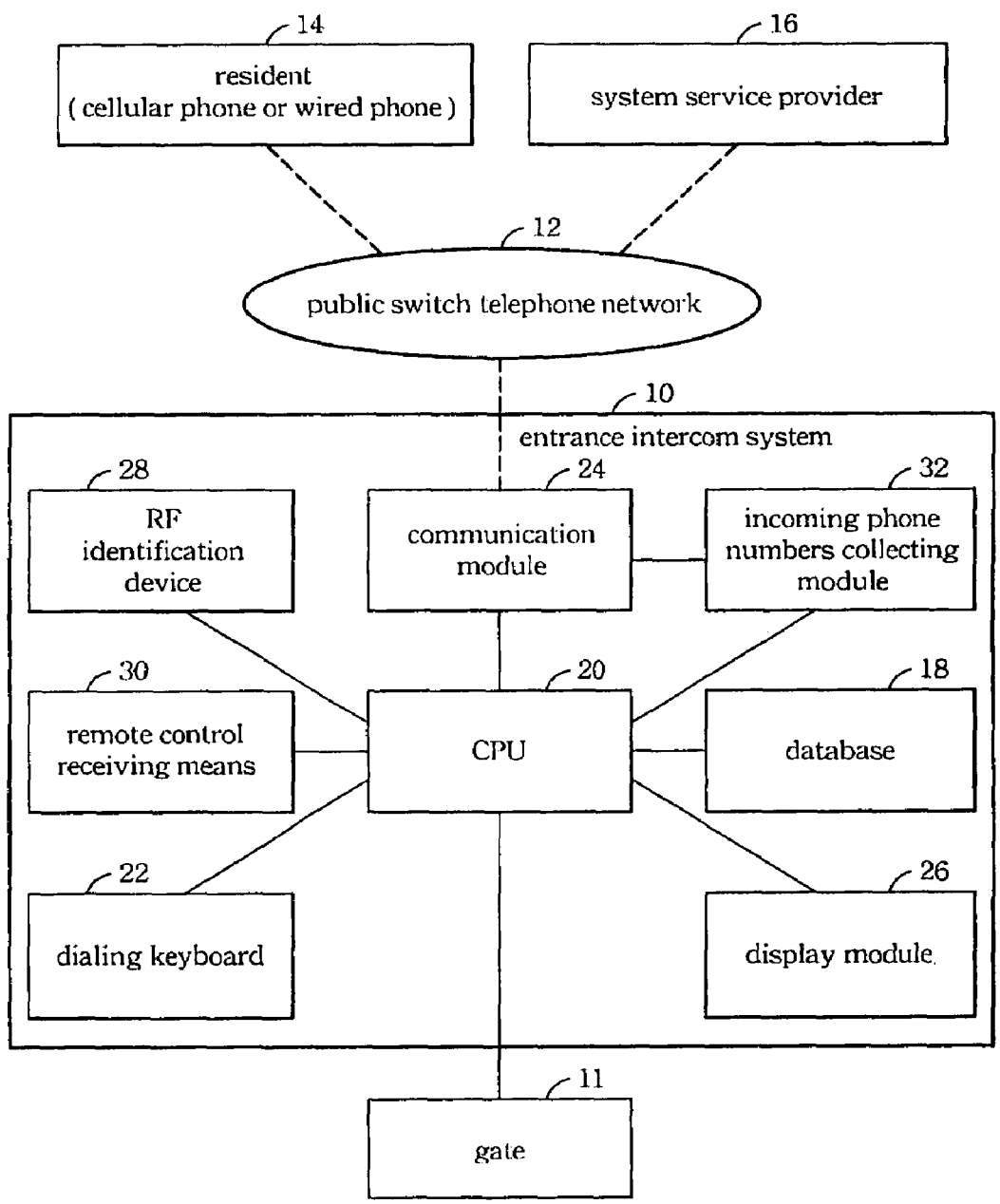
FIG. 1 is a schematic view showing the devices of an entrance intercom system.

Please refer to FIG. 1, the entrance intercom system 10 disclosed by the present invention is illustrated. This entrance intercom system 10 can be fabricated on the gate 11 of the community or the building to provide the identity recognition and dialogue functions between the visitors and the residents, and to lock/unlock the gate after ascertaining the visitor's identity. The entrance intercom system 10 can be connected to the resident 14 or the system service provider 16 via the circuits of the public switch telephone network 12 for contacting or data transferring.

In one embodiment of the present invention, the entrance intercom system 10 comprises a database 18, a central processing unit (CPU) 20, a dialing keyboard 22, a communication module 24, a display module 26, a radio-frequency (RF) identification device 28 and a remote control receiving means 30. The database 18 is applied to store the resident codes, the phone numbers and the identity recognizing codes. As to the communication module 24 is connected to the public switch telephone network 12 via the wiring circuits of telephones, so as to provide dialogue function between the visitors and the residents when the visitors use the dialing keyboard 22 to phone the resident 14, or to receive the incoming phone calls from other users via the public switch telephone network 12.

The CPU 20 is connected with the database 18 and the communication module 24 respectively. When the entry persons input a set of resident code, the CPU 20 can pick the phone number of the resident from the database 18 and the communication module 24 will automatically dial the phone number to try to contact with the resident, thereby the persons outsides the gate 11 can talk with the resident 14 via the entrance intercom system 10. The CPU 20 is also connected to the display module 26, such as a LCD, to show the related operating information and messages.

The CPU 20 is also connected to the RF identification device 28 and the remote control receiving means 30, so as to compare the ID messages detected with the identity recognizing codes stored in the database 18. When the residents dispose their ID cards near to the entrance intercom system 10, the RF identification device 28 can sense the ID message on the ID card and send it to the CPU 20. Then the CPU 20 will compare the ID message with the identity recognizing codes in the database 18. If the detected ID message is identical to the codes, the CPU 20 will send a driving signal to open the gate 11. Besides, the resident also can use the remote controller to send a signal to the remote control receiving means 30 for unlock the gate 11.

For the purpose of further promoting the ability to recognize identity and increasing the residents' convenience, the entrance intercom system 10 is designed to comprise an incoming phone number collecting module 32, connected to the communication module 24 and the CPU 20. When other users dial the entrance intercom system 10 via the public switch telephone network 12, the incoming phone number collecting module 32 can collect the phone number of the user and send it to the CPU 20. Then the CPU 20 will compare the incoming phone number with the resident phone numbers stored in the database 18. If the incoming phone number is identical to one set of phone number of the residents, the CPU 20 will send a driving signal to open the gate 11.

In other words, even the residents forget to carry the ID cards or the remote controllers, they can still use their cellular phone to dial the entrance intercom system 10 for opening the gate 11 when they want to go home. And after the CPU 20 comparing the incoming phone number with the phone numbers stored in the database 18 and ascertaining the incoming phone number is belong to one resident, the entrance intercom system 10 allow the resident using the cellular phone to unlock the gate 11.

Figure 2:
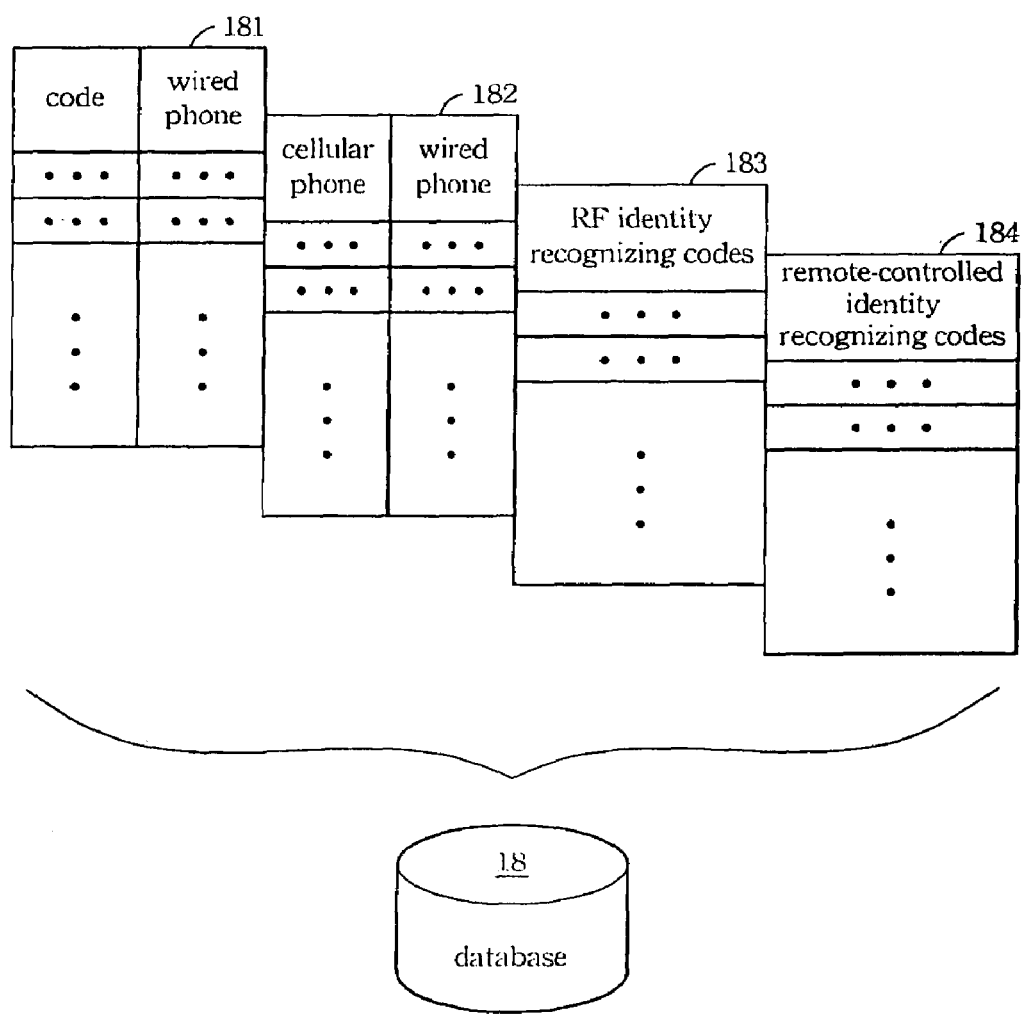
FIG. 2 is a schematic view showing the arranging manner of the data stored in the database of the entrance intercom system.

Please refer to FIG. 2, the manner to arrange the data stored in the database 18 is illustrated. The data stored in the database 18 can be divided into four parts. The first part 181 is the corresponding table of the resident code and the corresponding wired phone numbers. Thus, the visitor uses the entrance intercom system 10 to dial and contact with the resident 14 via the public switch telephone network 12.

As to the second part 182 is the corresponding table of the wired phone numbers and the cellular phone numbers of the same resident. When the entrance intercom system 10 is applied to dial the wired telephone of the resident, if the wired phone is busy or no answer, the CPU 20 will check the table of the second part 182 to find the cellular phone number of the resident and then the communication module 24 can automatically dial the cellular phone to try to contact with the resident. Therefore, even the resident is not at home or is not available to answer the wired phone call, the visitor still can contact with the resident by dialing the cellular phone.

As to the third and fourth parts 183 & 184 of the database 18 are applied to store the RF identity recognizing codes and the remote-controlled identity recognizing codes individually. The RF identity recognizing codes are used to check with the RF messages sensed from the ID cards. And the remote-controlled identity recognizing codes are used to check with the message signals sent form the remote controllers. When the message are ascertained and recognized, the CPU 20 will open the gate 11.

Figure 3:
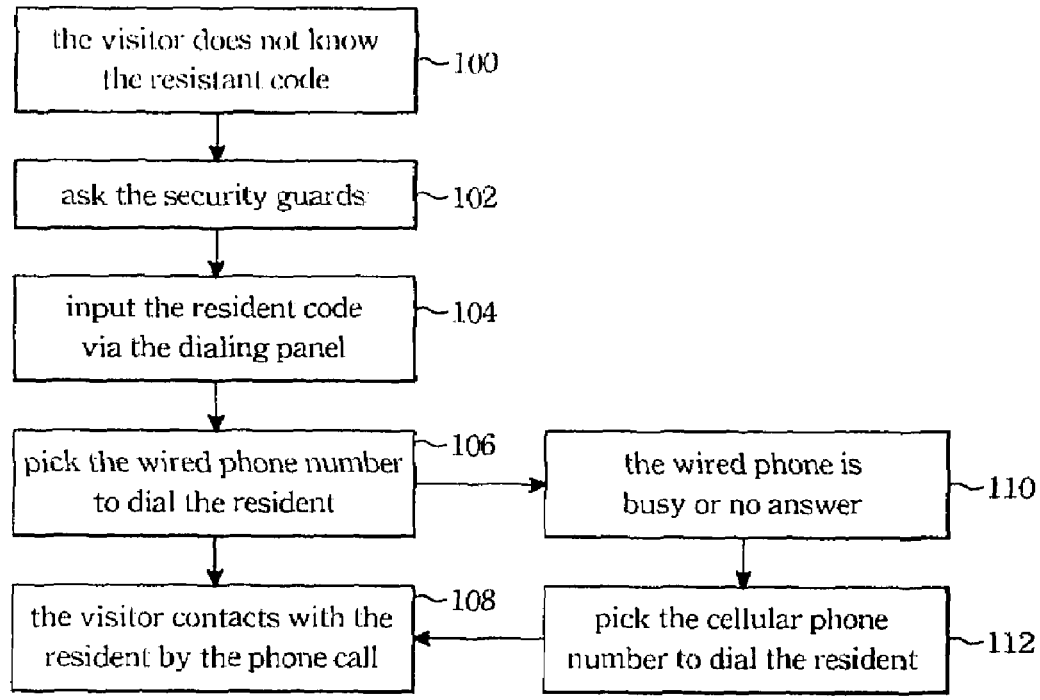
FIG. 3 is a flow chart showing the operating procedures of the entrance intercom system.

Please refer to FIG. 3, for featuring the efficacy of the entrance intercom system disclosed in the present invention, the operating procedure of the entrance intercom system is shown as follows. If the visitor does not know the resistant code of someone he want to visit (step 100), the visitor can push the assist button to ask the security guards (step 102) the resident code. Then, the visitor can input the resident code via the dialing keyboard (step 104), and the CPU will pick the wired phone number from the database and send it to the communication module so as to phone the resident (step 106). Thus, the visitor can contact with the resident by the phone call (step 108), and the resident can unlock the gate for the visitor. On the contrary, if the wired phone of the resident is busy or no answer (step 110), the CPU will automatically pick the cellular phone number of the resident and dial the resident (step 112) to try to contact with the resident.

Figure 4:
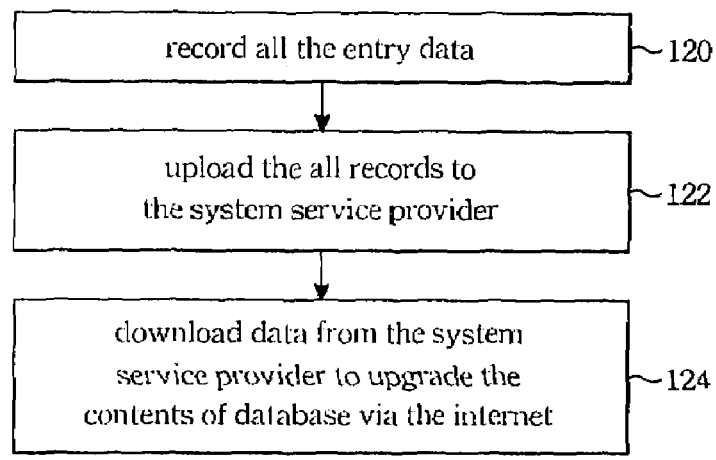
FIG. 4 is a flow chart showing the managing procedures of the entrance intercom system by the system service provider.

It is noted that for managing the entrance intercom system effectively, in the present invention, the system service provider 16 can upgrade the contents of the database 18 via the public switch telephone network 12 and collect the records in the entrance intercom system 10. The related procedures are illustrated in FIG. 4, each time, when the entrance intercom system 10 dials a phone number, answers an incoming phone call, or unlocks the gate 11, the CPU 20 will make a record and store it into the memory device of the database 18, thereby all the entry data will be recorded (step 120). In general, these records comprise the incoming phone numbers, the ID messages sensed by the RF identification device and the remote control receiving means, and the time of opening the gates. Then, the entrance intercom system 10 will dial the system service provider 16 at the predetermined time to upload the all records to the computer of the system service provider 16 (step 122). In a preferred embodiment, the entrance intercom system 10 can connect to the computer of the system service provider 16 via the internet firstly, and then perform the uploading procedure. And the uploading time is preferred set at AM 2~4 to prevent the residents form being incapable of operating the entrance intercom system.

After uploading the whole records of the entrance intercom system 10, the system service provider 16 also can download data to upgrade the contents of database 18 via the internet (step 124). In general, when there are residents moving in or out, or some operating data is required to updated, the system service provider 16 can download the data into the entrance intercom system 10 via the internet to keep it with the optimal operating performance. And because the system service provider 16 can download immediately the information, wired phone numbers, the cellular phone numbers of the new residents into the entrance intercom system 10, the security, of the community can be controlled and maintained more precisely and effectively.

The present invention has considerable advantages: (1) because the cellular phone numbers of the residents are stored in the database, even the resident is not at home, the visitor still can contact with the resident via the entrance intercom system; (2) further, even the residents forget to carry their ID cards or remote controllers, they can still use their cellular phone to dial the entrance intercom system for opening the gate; (3) because the entrance intercom system can contact with the system service provider at the predetermined time to upload the records and download the updated data, the entrance intercom system can be maintained with the actual states and information of whole residents and be keep with the optimal operating condition.

The invention has been described using exemplary preferred embodiments. However, it is to be understood that the scope of the invention is not limited to the disclosed embodiments. On the contrary, it is intended to cover various modifications aid similar arrangements. The scope of the claims, therefore, should be accorded the broadest interpretation so as to encompass all such modifications and similar arrangements.

What is claimed is:

1. An entrance intercom system, fabricated on the gate of a community, providing the functions of communicating between visitors and residents, identity recognizing, locking/unlocking the gate, said entrance intercom system comprising:

a data base, storing the resident codes, the phone numbers and the identity recognizing codes of the residents of the community;

a communication module, coupled with public switch telephone networks, providing the communicating function between the visitors and the residents, and receiving the incoming phone calls;

a CPU, connected with said data base and said communication module respectively, responsive to the resident codes input by the visitors via a dialing keyboard, to select the phone numbers of the resident stored in said data base, and to drive said communication module automatically to dial the resident for providing the communicating function between the visitors and the resident;

an incoming phone numbers collecting module, connected with said communication module and said CPU respectively, collecting the incoming phone numbers, said CPU compares said incoming phone numbers and the phone numbers of the residents stored in said data base, when the incoming phone number is identical to one of the phone numbers of the residents in said data base, said CPU will send a signal to unlock said gate;

a RF identification device, for detecting the RF messages of identity recognizing and sending to said CPU, said CPU compares said RF messages with said identity recognizing codes stored in said data base, when said RF message is identical to that of the resident in said data base, said CPU will send a signal to unlock said gate; and a remote control receiving means, for receiving remote control messages of identity recognizing and sending to said CPU, said CPU compares said remote control messages with the identity recognizing codes stored in said data base, when the remote control message is identical to one of the identity recognizing codes of the residents, said CPU will send a signal to unlock said gate, wherein said phone numbers of the residents stored in said database includes wired telephone numbers and cellular phone numbers of the residents, and when the incoming phone number of the cellular phone collected by said incoming phone number collecting module is identical to one of the phone numbers stored in said database, said CPU will send a signal to unlock said gate, whereby the resident utilizes a cellular phone to dial said entrance intercom system for unlocking said gate.

2. The system according to claim 1, when said communication module is utilized to dial the wired telephone of the resident, if said wired telephone is busy or no answer, said communication module will automatically dial the cellular phone of the resident.

* * * * *